United States Patent Office 3,635,921
Patented Jan. 18, 1972

3,635,921
CRYSTALLINE TERPOLYMERS OF 4-METHYL-PENTENE, 3 - METHYLPENTENE AND AN ALPHA OLEFIN
James Keith Hambling, Frimley, near Aldershot, and David Allison Woodhead, Shepperton, England, assignors to The British Petroleum Company Limited, London, England
No Drawing. Continuation of application Ser. No. 600,401, Dec. 9, 1966. This application Nov. 17, 1969, Ser. No. 871,574
Claims priority, application Great Britain, Dec. 16, 1965, 53,350/65
Int. Cl. C08f 15/40
U.S. Cl. 260—80.78                    5 Claims

ABSTRACT OF THE DISCLOSURE

This invention provides a process for the production of a crystalline terpolymer of improved mechanical properties by copolymerizing 4-methylpentene-1, 3-methylpentene-1, and a normal alpha olefin in the presence of a catalyst.

---

This is a continuation of application Ser. No. 600,401 filed Dec. 9, 1966 and now abandoned.

This invention relates to a process for the production of substantially crystalline terpolymers derived from branched-chain alpha olefins and normal alpha olefins.

According to the present invention there is provided a process for the production of a substantially crystalline terpolymer of improved mechanical properties with respect to a homopolymer of 4-methylpentene-1 of equivalent crystallinity and molecular weight which process comprises copolymerising a major proportion of 4-methylpentene-1 with a minor proportion of 3-methylpentene-1, and a minor proportion of a normal alpha-olefin in the presence of a catalyst obtained from (a) a solid crystalline compound of a metal selected from Group IV, V, VI, VII or VIII of the Periodic Table according to Mendeleef, the metal being in a lower valency state than its maximum and (b) an organo metallic compound of a metal selected from Group I, II or III of the Table.

Preferably the minor proportion of 3-methylpentene-1 comprises 5-20 mol percent of the total, preferably 10-20 mol percent.

Preferably the minor proportion of the normal alpha olefin comprises 0.1 to 3.0 mol percent of the total.

When proportions in the lower region of the above ranges are employed copolymers are obtained the mechanical properties of which are superior to those of homopolymers of 4-methylpentene-1 of equivalent molecular weight. As the proportion of 3-methylpentene-1 and/or normal olefin utilised increases, amorphous polymer tends to be produced in increasing quantities. The presence of amorphous polymer impairs the mechanical properties of the crystalline copolymer. The point at which the improvement in mechanical properties due to the formation of the crystalline terpolymer will be balanced by the deterioration due to the presence of amorphous polymer is dependent to some extent on the processing to which the material will be subjected after formation.

In some instances little benefit may be obtained from initial 3-methylpentene-1 contents and normal olefin contents below these figures, such instances may be determined by simple tests.

Suitable linear olefins include ethylene, propylene, pentene-1, hexene-1, octene-1 and decene-1. Hexene-1 is the preferred linear olefin since it polymerises very rapidly when compared with 4-methylpentene-1 or 3-methylpentene-1.

Maximum benefit is obtained from terpolymers having a 3-methylpentene-1 content of 16–18% and a hexene-1 content of 1–2%.

Preferably polymerisation is effected in a process in which the ratio and concentration of the monomers are kept constant by the continuous addition of a monomer mixture feedstock corresponding in composition and quantity to the terpolymer being formed. The ratio and rate of the feed is predetermined by analyses of low conversion batch runs.

Since hexene-1 polymerises very rapidly when compared with 4-methylpentene-1 or 3-methylpentene-1 when it is employed it is required only in the continuous feed (corresponding in quantity and composition to the polymer being formed) and not in the initial bulk feed. The hexene-1 content of the terpolymer is the same as that in the continuous feed.

Preferably the crystalline compound is a halide of a transition element. Most preferably it is titanium trichloride.

Preferably the organo metallic compound is a compound of aluminum and most preferably an alkyl aluminium halide. The preferred aluminium alkyl halide is aluminium diethyl monochloride.

Preferably the molar ratio of component (a) of the catalyst to component (b) is in the range 1:1 to 1:10, most preferably in the range 1:1 to 1:4.

Polymerisation is preferably effected in the presence of an inert diluent which is a non-solvent for component (a) of the catalyst. Suitable diluents include normally liquid hydrocarbons, for example, heptane, octane, benzene, toluene and xylene.

Polymerisation may be carried out in the absence of solvents for the monomer whilst maintaining the monomers in the liquid state if desired.

Preferably polymerisation is carried out at a temperature in the range −20° C. to 120° C., most preferably in the range 20° to 90° C.

Preferably the concentration of component (a) of the catalyst lies between 0.1 and 50, most preferably between 0.5 and 30 millimoles per litre of reaction medium.

The pressure may be sub-atmospheric, atmospheric or super-atmospheric. Preferably polymerisation is carried out in the presence of a molecular weight control agent. Most preferably the molecular weight control agent is hydrogen.

The terpolymers are less brittle and have lower tensile moduli than copolymers of 4-methylpentene-1 and 3-methylpentene-1 of the same tensile strength. They suffer no loss in transparency compared with homopolymers of 4-methylpentene-1.

The processability of these terpolymers is much improved over copolymers without hexene-1 and they will melt spin and draw into filaments as easily as homopoly-4-methylpentene-1. The resultant fibres have better retention of tenacity at high temperatures than the homopolymer as the table below shows.

| Temp. | Tenacities, g./denier | | | | | |
|---|---|---|---|---|---|---|
| | Homopoly-4MP-1* | | | Terpolymer 15% 3MP-1, 2% hexene-1* | | |
| 23° C | 8.0 | 6.0 | 3.8 | 7.5 | 6.8 | 4.3 |
| 100° C | 1.2 | 0.8 | 0.5 | 1.6 | 1.2 | 0.9 |

*High, medium and low stretch-ratio samples.

It is believed that the presence of units derived from 3-methylpentene-1 causes the polymer to adopt a different crystal structure from that assumed by poly-4-methylpentene-1. The presence of units derived from the linear olefin improves the processability of the polymer. The combination of the monomers assists in the retention of tensile strength at elevated temperature.

The substantially crystalline terpolymers are clear, transparent, colourless materials.

Our British Pat. No. 1,096,265 discloses a process for the proudction of a crystalline copolymer of improved mechanical properties with respect to a homopolymer of 4-methylpentene-1 of equivalent crystallinity and molecular weight which process comprises copolymerising a major proportion of 4-methylpentene-1 with a minor proporton of 3-methylpentene-1, in the presence of a catalyst obtained from (a) a solid crystalline compound of a metal selected from Group IV, V, VI, VII or VIII of the Periodic Table according to Mendeleef, the metal being in a lower valency state than its maximum and (b) an organo metallic compound of a metal selected from Group I, II or III of the Table.

The invention is illustrated by the following example.

EXAMPLE

A 5 litre, 5-neck stirred glass reactor was purged with dry, oxygen free, nitrogen. 540 ml. 4-methylpentene-1 and 660 ml. 3-methylpentene-1 (both distilled over potassium) were introduced into the reactor together with 1500 ml. n-heptane (distilled over sodium) and brought to 45° C.

5.2 gms. A—A titanium trichloride and 9.40 g. aluminum diethyl monochloride were added to 400 ml. dry n-heptane and stirred for 1 hour at room temperature were added to 400 ml. dry n-heptane and stirred for 1 hour at room temperature prior to addition to the reaction. As the catalyst slurry was introduced a feed of 4-methylpentene-1 containing 19 percent 3-methylpentene-1 and 2 percent hexene-1 was introduced into the reactor at 270 ml./h. A 50 percent $H_2/N_2$ molecular weight control gas mixture was passed through the reactor at about 20 litres per hour.

Polymerisation temperature was maintained at 50° C. for 5 hours when the catalyst was deactivated with 500 ml. methanol containing 50 ml. acetyl acetone. After precipitation and washing, 800 gm. terpolymer were obtained containing 16 percent 3-methylpentene-1 and 2 percent hexene-1.

The terpolymer moulded at 260° C. Its tensile properties are compared with a 3-methylpentene-1/4-methylpentene-1 copolymer and also a homopolymer of 4-methylpentene-1.

| | °C. | Terpolymer | 14% 3MP-1 copolymer | Homopolymer 4MP-1 |
|---|---|---|---|---|
| Tensile strength (p.s.i.×$10^{-3}$) | 23 | 4.45 | 4.40 | 4.00 |
| | 50 | 2.75 | 2.75 | 2.00 |
| | 100 | 1.50 | 1.50 | 1.00 |
| Tensile modulus (p.s.i.×$10^{-5}$) | 23 | 2.30 | 3.00 | 2.90 |
| | 100 | 0.55 | 0.65 | 0.35 |

NOTE.—Measured on Instron Tensometer at 50 percent/min. strain rate.

What is claimed is:

1. A substantially crystalline terpolymer of 4-methylpentene-1, a minor proportion comprising 5–20 mol percent of the total of 3-methylpentene-1 and a minor proportion comprising 0.1 to 3.0 mol percent of a normal $C_2$–$C_{10}$ alpha olefin having improved mechanical properties with respect to a homopolymer of 4-methylpentene-1 of equivalent crystallinity and molecular weight, which terpolymer is capable of being melt spun to a fibre of high tenacity at high temperature.

2. A terpolymer as defined in claim 1 wherein the minor proportion of 3-methylpentene-1 comprises 10–20 mol percent of the total.

3. A terpolymer as defined in claim 1 wherein the normal alpha olefin is ethylene, propylene, pentene-1, octene-1 or decene-1.

4. A terpolymer as defined in claim 1 wherein the normal alpha olefin is hexene-1.

5. A terpolymer as defined in claim 4 wherein the 3-methylpentene-1 content is 16–18 mol percent and the hexene-1 content is 1–2%.

References Cited

UNITED STATES PATENTS

| 3,029,215 | 4/1962 | Campbell | 260—33.6 |
| 3,299,022 | 1/1967 | Edwards | 260—88.2 |
| 3,091,601 | 5/1963 | Reding | 260—80.6 |
| 3,376,248 | 4/1968 | Kirkland | 260—33.6 |
| 3,489,735 | 1/1970 | Clark | 260—88.2 |
| 3,316,226 | 4/1967 | Clark | 260—88.2 |

FOREIGN PATENTS 1,101,987   2/1968   Great Britain.

JOSEPH L. SCHOFER, Primary Examiner

R. S. BENJAMIN, Assistant Examiner